US011140592B2

(12) United States Patent
Li et al.

(10) Patent No.: US 11,140,592 B2
(45) Date of Patent: Oct. 5, 2021

(54) METHOD AND APPARATUS FOR SELECTING RADIO ACCESS NETWORK DEVICE

(71) Applicant: Huawei Technologies Co., Ltd., Shenzhen (CN)

(72) Inventors: Yongcui Li, Beijing (CN); Tingfang Tang, Shenzhen (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/796,550

(22) Filed: Feb. 20, 2020

(65) Prior Publication Data

US 2020/0196208 A1 Jun. 18, 2020

Related U.S. Application Data

(63) Continuation of application No. PCT/CN2018/088917, filed on May 30, 2018.

(30) Foreign Application Priority Data

Aug. 21, 2017 (CN) .......................... 201710718740.2

(51) Int. Cl.
*H04W 36/00* (2009.01)
*H04W 36/32* (2009.01)

(52) U.S. Cl.
CPC . *H04W 36/00835* (2018.08); *H04W 36/0066* (2013.01); *H04W 36/00837* (2018.08); *H04W 36/32* (2013.01)

(58) Field of Classification Search
CPC ..... H04W 36/00835; H04W 36/00837; H04W 36/0066; H04W 36/32; H04W 92/20;
(Continued)

(56) References Cited

U.S. PATENT DOCUMENTS

| 2013/0044709 | A1* | 2/2013 | Adjakple | .............. H04W 76/15 370/329 |
| 2018/0027610 | A1* | 1/2018 | Werner | ............... H04W 84/045 370/331 |

(Continued)

FOREIGN PATENT DOCUMENTS

| CN | 102340844 A | 2/2012 |
| CN | 103141150 A | 6/2013 |

(Continued)

OTHER PUBLICATIONS

Qualcomm et al., "TS 23.502: PDU sessions handling for LADNs," SA WG2 Meeting #S2-122, S2-174453, San Jose Del Cabo, Mexico, Jun. 26-30, 2017, 36 pages.

(Continued)

*Primary Examiner* — Julio R Perez
(74) *Attorney, Agent, or Firm* — Slater Matsil, LLP

(57) ABSTRACT

This application relates to the field of wireless communications technologies, and provides a method for selecting a radio access network device. The method includes: obtaining, by a first RAN device, capability information of a second RAN device, where the capability information is used to indicate an LADN supported by the second RAN device; and sending, by the first RAN device, a handover request message to the second RAN device.

15 Claims, 11 Drawing Sheets

(58) Field of Classification Search
CPC . H04W 36/08; H04W 36/0016; H04W 36/38; H04W 24/10
See application file for complete search history.

(56) References Cited

U.S. PATENT DOCUMENTS

| | | | |
|---|---|---|---|
| 2019/0021043 A1* | 1/2019 | Youn | H04W 36/0055 |
| 2019/0274076 A1* | 9/2019 | Kim | H04W 36/00 |
| 2019/0387393 A1* | 12/2019 | Xu | H04W 8/08 |
| 2020/0120570 A1* | 4/2020 | Youn | H04W 36/0033 |

FOREIGN PATENT DOCUMENTS

| | | |
|---|---|---|
| CN | 104301883 A | 1/2015 |
| CN | 102577575 B | 8/2015 |
| CN | 102685847 B | 3/2016 |
| WO | 2016156439 A1 | 10/2016 |

OTHER PUBLICATIONS

3rd Generation Partnership Project; Technical Specification Group Services and System Aspects; System Architecture for the 5G System; Stage 2 (Release 15), 3GPP TS 23.501 V1.2.0 (Jul. 2017), 166 pages.

Qualcomm et al., "TS 23.501—Completion of LADN details," SA WG2 Meeting #S2-122, S2-174452, San Jose Del Cabo, Mexico, Jun. 26-30, 2017, 9 pages.

LG Electronics et al., "TS 23.502: Handover of LADN PDU Session," SA WG2 Meeting #122bis, S2-175791, Sophia Antipolis, France, Aug. 21-25, 2017, 7 pages.

* cited by examiner

METHOD AND APPARATUS FOR SELECTING RADIO ACCESS NETWORK DEVICE

CROSS-REFERENCE TO RELATED APPLICATIONS

This application is a continuation of International Application No. PCT/CN2018/088917, filed on May 30, 2018, which claims priority to Chinese Patent Application No. 201710718740.2, filed on Aug. 21, 2017. The disclosures of the aforementioned applications are hereby incorporated by reference in their entireties.

TECHNICAL FIELD

The present invention relates to the field of communications technologies, and in particular, to a method and an apparatus for selecting a radio access network device.

BACKGROUND

A local area data network (LADN) is a network that is mainly deployed for scenarios such as an enterprise, a stadium activity, and a concert hall and that is proposed in a 5th generation mobile communications technology (5G). The LADN is characterized by that the terminal device can access the LADN only when a terminal device is located in a service area (SA) of the LADN. When the terminal device moves out of the SA of the LADN, the terminal device cannot access the LADN network, and a session (LADN session) previously accessing the LADN is also disconnected.

Currently, when a mobile handover (HO) is performed for the terminal device, a source radio access network (RAN) device serving the terminal device makes a handover decision based on a measurement report of the terminal device, then selects a target RAN device from candidate RAN devices, and sends a handover request to the target RAN device.

However, after the mobile handover is performed for the terminal device, the terminal device may not access the LADN by using the target RAN device after the handover. As shown in FIG. 1, a RAN device 1 (RAN 1 for short) and a RAN device 2 (RAN 2 or short) are within a coverage area of an LADN SA, and a RAN device 3 (RAN 3 for short) is not within the coverage area of the LADN SA. Before the mobile handover, the terminal device is located within a coverage area of the RAN 1. When the terminal device moves to coverage areas of the RAN 2 and the RAN 3, according to the prior art, the RAN 1 may select the RAN 3 as a handover target, thereby reducing user experience.

SUMMARY

Embodiments of the present invention provide a method and an apparatus for selecting a radio access network device.

According to an aspect, an embodiment of this application provides a method for selecting a radio access network RAN device. The method includes: obtaining, by a first radio access network RAN device, capability information of a second RAN device; and sending, by the first RAN device, a handover request message to the second RAN device. The capability information is used to indicate a local area data network LADN supported by the second RAN device. For example, the capability information includes at least one of a data network name (DNN), a DNN index, an IP address or prefix, or IP routing information of the LADN.

Based on the foregoing solution, when a mobile handover is performed for a terminal device, the first RAN device may send, based on obtained capability information of a plurality of adjacent RAN devices, a handover request to the second RAN device supporting the LADN, so that a mobile terminal can access an LADN service after accessing the second RAN device, thereby improving user experience.

In a possible design, the first RAN device may obtain the capability information of the second RAN device in the following manner: The first RAN device sends a connection setup request message (for example, an Xn setup request message) to the second RAN device, and receives a connection setup response message from the second RAN device. The connection setup response message includes the capability information of the second RAN device. In this way, the first RAN device completes setup of a connection to the second RAN device, and obtains the capability information of the second RAN device from the second RAN device. Similarly, the first RAN device may obtain capability information of another adjacent RAN through a connection setup (for example, an Xn connection) process between RAN devices.

In a possible design, before the sending, by the first RAN device, a handover request message to the second RAN device, the method further includes: determining, by the first RAN device, that a terminal device accesses the LADN by using a first session. Therefore, when the terminal device accesses a specific LADN by using the first session, the first RAN device may send a handover request to a second RAN device supporting the specific LADN, so that the first session is not interrupted or suspended after the mobile terminal accesses the second RAN device. In this way, a service accessing the specific LADN is not interrupted or suspended, thereby further improving user experience.

In a possible design, the method further includes: receiving, by the first RAN device, an association between a session identifier of the first session and a first network name of the LADN from a session management function SMF network element; or receiving, by the first RAN device, a second network name from an SMF network element, and determining that the second network name is corresponding to the LADN. Therefore, the first RAN device obtains the association between the session identifier of the first session and the network name (for example, the first network name or the second network name), and may select a handover target for the terminal device based on the association when the mobile handover is performed for the terminal device.

According to another aspect, this application further discloses a communication method. The method includes: obtaining, by a second RAN device, capability information of the second RAN device from an AMF network element; and sending, by the second RAN device, the capability information of the second RAN device to a first RAN device. The capability information is used to indicate a local area data network LADN supported by the second RAN device.

Based on the foregoing solution, the second RAN device sends the capability information of the second RAN device obtained from the AMF network element to the first RAN device. After the first RAN device obtains the capability information, and when a handover target is selected for a terminal device, a RAN device (for example, the second RAN device) supporting the LADN may be preferentially handed over for the terminal device, so that the terminal device can access an LADN service after the handover, thereby improving user experience.

In a possible design, the second RAN device may obtain the capability information in the following manner: The second RAN device obtains the capability information of the second RAN device from the AMF network element in a process of setting up a connection (for example, an N2 connection) between the second RAN device and the AMF network element. In this way, the second RAN device completes setup of a connection to the AMF network element, and obtains the capability information of the second RAN device from the AMF network element. The capability information of the second RAN device may be used in a scenario in which a handover is performed for the terminal device, and is further applicable to another communication application scenario.

In a possible design, the second RAN device may send the capability information of the second RAN device to the first RAN device in the following manner: The second RAN device receives a connection setup request message (for example, an Xn setup request message) from the first RAN device, and sends a connection setup response message (an Xn setup response message) to the first RAN device, where the connection setup response message includes the capability information. In this way, the first RAN device completes setup of a connection to the second RAN device, and obtains the capability information of the second RAN device from the second RAN device.

According to still another aspect, this application further discloses a communication method. The method includes: receiving, by an AMF network element, a connection setup request message (for example, an NG setup request message) from a RAN device; and sending, by the AMF network element, capability information of the RAN device to the RAN device. The capability information is used to indicate an LADN supported by the RAN device. For example, after receiving the connection setup request message, the AMF network element searches for the capability information of the RAN device, and then sends the capability information to the RAN device.

Based on the foregoing solution, the AMF network element completes setup of a connection to the RAN device, and sends the capability information of the RAN device to the RAN device. The capability information may be used in a scenario in which a handover is performed for the terminal device. In addition, the capability information may be further applied to another communication application scenario.

In a possible design, the capability information of the RAN device includes at least one of a DNN, an IP address or prefix, or IP routing information of the first LADN. Therefore, the capability information of the RAN device may represent the LADN supported by the RAN device.

In a possible design, the capability information of the RAN device further includes a correspondence between a cell identifier or a tracking area identifier and at least one of a DNN, an IP address or prefix, or IP routing information of the first LADN. For example, when a coverage area of the LADN supported by the RAN device is in a granularity of a tracking area, the first RAN device may select a RAN device (for example, a second RAN device) supporting the first LADN as a handover target based on the correspondence between the tracking area identifier and at least one of the DNN, the IP address or prefix, or the IP routing information of the first LADN. Alternatively, when a coverage area of the LADN supported by the RAN device is in a granularity of a cell, the first RAN device may select, based on the correspondence between the cell identifier and at least one of the DNN, the IP address or prefix, or the IP routing information of the first LADN, a cell supporting the first LADN of a RAN device (for example, a second RAN device) as a target cell for the handover.

According to still another aspect, this application further discloses a communication method. The method includes: receiving, by an SMF network element, a session identifier of a first session and a network name from a terminal device; and sending, by the SMF network element, session management information to a RAN device. The session management information includes an association between the session identifier and the network name.

Based on the foregoing solution, the first RAN device preferentially selects a RAN device supporting an LADN as a handover target, so that a terminal device can access the LADN by using a target RAN device, thereby improving user experience.

In a possible design, the method further includes: determining, by the SMF network element, that the terminal device accesses a local area data network LADN by using the first session. Therefore, when the terminal device accesses a specific LADN by using the first session, the first RAN device may send a handover request to a second RAN device supporting the specific LADN, so that the first session is not interrupted or suspended after a mobile terminal accesses the second RAN device. In this way, a service accessing the specific LADN is not interrupted or suspended, thereby further improving user experience.

In a possible design, the method further includes: the network name corresponding to the LADN is preconfigured in the SMF network element; or obtaining, by the SMF from an AMF network element, the network name corresponding to the LADN; or obtaining, by the SMF network element from a PCF network element, the network name corresponding to the LADN; or obtaining, by the SMF network element from a data management network element, the network name corresponding to the LADN. Therefore, the SMF network element may obtain the network name corresponding to the LADN.

According to still another aspect, an embodiment of this application provides a radio access network device. The radio access network device has a function of implementing behavior of the radio access network device (for example, the first RAN device) in the foregoing method. The function may be implemented by hardware, or implemented by hardware executing corresponding software. The hardware or the software includes one or more modules corresponding to the foregoing function. In a possible design, a structure of the radio access network device includes a processor and a transceiver. The processor is configured to support the radio access network device in performing a corresponding function in the foregoing method. The transceiver is configured to implement communication between the radio access network device and an access and mobility management function network element/another radio access network device (for example, a second RAN device). The radio access network device may further include a memory. The memory is configured to be coupled to the processor, and the memory stores a program instruction and data that are necessary for the radio access network device.

According to still another aspect, an embodiment of this application provides a radio access network device. The radio access network device has a function of implementing behavior of the radio access network device (for example, the second RAN device) in the foregoing method. The function may be implemented by hardware, or implemented by hardware executing corresponding software. The hardware or the software includes one or more modules corresponding to the foregoing function. In a possible design, a structure of the radio access network device includes a processor and a transceiver. The processor is configured to support the radio access network device to in performing a corresponding function in the foregoing method. The transceiver is configured to implement communication between the radio access network device and an access and mobility management function network element/another radio access network device (for example, a first RAN device). The radio access network device may further include a memory. The memory is configured to be coupled to the processor, and the memory stores a program instruction and data that are necessary for the radio access network device.

According to still another aspect, an embodiment of this application provides a communications apparatus. The communications apparatus has a function of implementing behavior of the AMF network element in the foregoing method. The function may be implemented by hardware, or implemented by hardware executing corresponding software. The hardware or the software includes one or more modules corresponding to the foregoing function. In a possible design, a structure of the communications apparatus includes a processor and a transceiver. The processor is configured to support the communications apparatus in performing a corresponding function in the foregoing method. The transceiver is configured to implement communication between the communications apparatus and a terminal device/a radio access network device (for example, a first or a second RAN device)/a session management function network element. The communications apparatus may further include a memory. The memory is configured to be coupled to the processor, and the memory stores a program instruction and data that are necessary for the communications apparatus.

According to still another aspect, an embodiment of this application provides a communications apparatus. The communications apparatus has a function of implementing behavior of the SMF network element in the foregoing method. The function may be implemented by hardware, or implemented by hardware executing corresponding software. The hardware or the software includes one or more modules corresponding to the foregoing function. In a possible design, a structure of the communications apparatus includes a processor and a transceiver. The processor is configured to support the communications apparatus in performing a corresponding function in the foregoing method. The transceiver is configured to implement communication between the communications apparatus and a terminal device/a radio access network device (for example, a first or a second RAN device)/an access and mobility management function network element. The communications apparatus may further include a memory. The memory is configured to be coupled to the processor, and the memory stores a program instruction and data that are necessary for the communications apparatus.

According to still another aspect, an embodiment of this application provides a communication method, and the method includes: receiving, by a terminal device, an association between an access network identifier and an LADN from an access network discovery network element (for example, an access network discovery and selection function network element in the 4G, or a PCF network element in the 5G); and accessing, by the terminal device based on the association, an access network corresponding to the access network identifier.

Based on the foregoing solution, when the terminal device moves and needs to reselect a non-3GPP access network, the terminal device sends, based on the obtained association between the access network identifier and a network name of the LADN, a access request to the access network device corresponding to the access network identifier. Because the access network device corresponding to the access network identifier supports the LADN, the terminal device can access an LADN service after accessing the access network device, thereby improving user experience.

In a possible design, the method further includes: before the accessing, by the terminal device based on the association between the access network identifier and the LADN, an access network corresponding to the access network identifier, determining, by the terminal device, that the terminal device accesses the LADN by using a first session. Therefore, in a scenario of the non-3GPP access network, the terminal device may access, by knowing a network name of a specific LADN that is accessed by the terminal device by using the first session and based on an obtained association between an identifier of a candidate access network that can be accessed and the network name of the LADN, an access network device supporting the specific LADN when an access network needs to be changed. Therefore, a service of the specific LADN is not interrupted, thereby improving user experience.

According to still another aspect, an embodiment of this application provides a terminal device. The terminal device has a function of implementing behavior of the terminal device in the foregoing method. The function may be implemented by hardware, or implemented by hardware executing corresponding software. The hardware or the software includes one or more modules corresponding to the foregoing function. In a possible design, a structure of the terminal device includes a processor and a transceiver. The processor is configured to support the terminal device in performing a corresponding function in the foregoing method. The transceiver is configured to implement communication between the terminal device and a radio access network device/an access and mobility management function network element/an access discovery network element. The terminal device may further include a memory. The memory is configured to be coupled to the processor, and the memory stores a program instruction and data that are necessary for the terminal device.

According to still another aspect, an embodiment of this application provides a computer readable storage medium. The computer readable storage medium stores an instruction, and when the instruction is run on a computer, the computer is enabled to perform the methods in the foregoing aspects.

According to still another aspect, an embodiment of this application provides a computer program product including an instruction. When the instruction is run on a computer, the computer performs the methods in the foregoing aspects.

According to still another aspect, this application provides a chip system. The chip system includes a processor, configured to support the radio access network device, the communications apparatus, or the terminal device in implementing the functions in the foregoing aspects, for example, generating or processing the information in the foregoing methods. In a possible design, the chip system further includes a memory. The memory is configured to store a program instruction and data that are necessary for a data sending device. The chip system may include a chip, or may include a chip and another discrete device.

BRIEF DESCRIPTION OF THE DRAWINGS

To describe the technical solutions in the embodiments of the present invention or in the background more clearly, the following briefly describes the accompanying drawings required for describing the embodiments of the present invention or the background.

DETAILED DESCRIPTION OF ILLUSTRATIVE EMBODIMENTS

The network architectures and the service scenarios described in this application are intended to describe the technical solutions in this application more clearly, and do not constitute a limitation to the technical solutions provided in this application. A person of ordinary skill in the art may know that with evolution of network architectures and emergence of new service scenarios, the technical solutions provided in this application are also applicable to similar technical problems.

"A plurality of" in this application refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
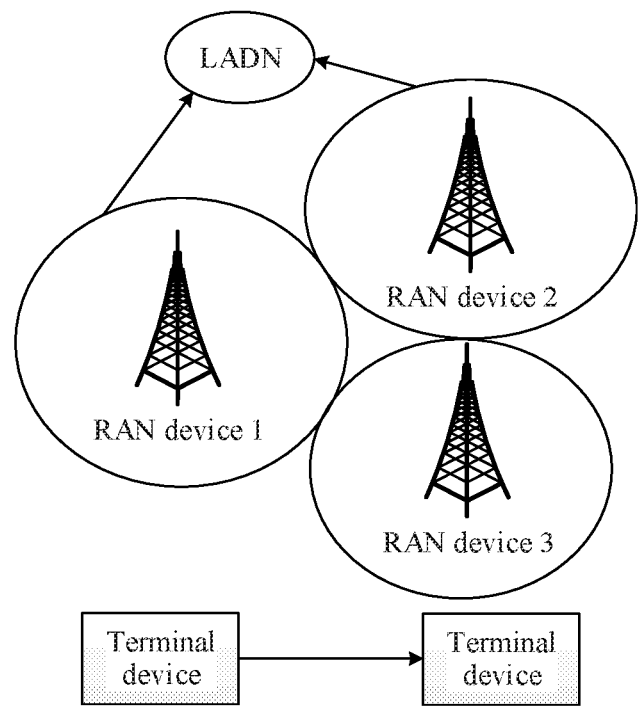
FIG. 1 is a schematic diagram of a scenario in which a mobile handover is performed for a terminal device in the prior art of this application.
Figure 2:
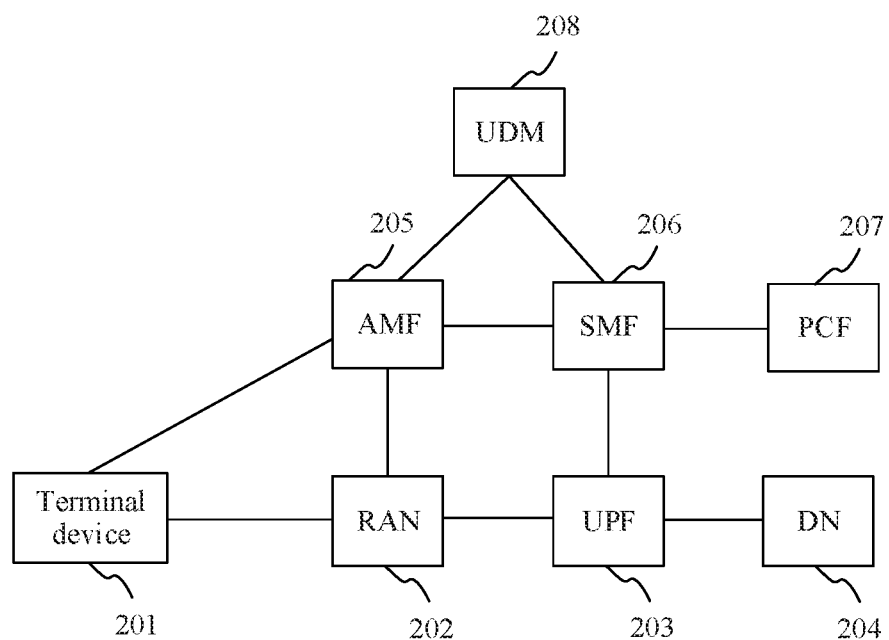
FIG. 2 is a schematic diagram of a 5G communications system according to an embodiment of this application.

FIG. 2 is a schematic diagram of a 5G communications system that may be trial according to an embodiment of this application. In a 5G mobile network architecture, a control plane function and a forwarding plane function of a mobile gateway are decoupled, and a separated control plane function of the mobile gateway, and a conventional control network element mobility management entity (MME) of a 3rd generation partnership project (3GPP), and the like are combined into a unified control plane. A user plane function (UPF) network element can implement user plane functions (SGW-U and PGW-U) of a serving gateway (SGW) and a packet data network gateway (PGW). Further, a unified control plane network element may be decomposed into an access and mobility management function (AMF) network element and a session management function (SMF) network element.

In addition, the embodiments of this application are also applicable to another future-oriented communications technology. The system architectures and the service scenarios described in the embodiments of this application are intended to describe the technical solutions in the embodiments of this application more clearly, and do not constitute a limitation to the technical solutions provided in the embodiments of this application. A person of ordinary skill in the art may know that with the evolution of the network architectures and the emergence of new service scenarios, the technical solutions provided in the embodiments of this application are also applicable to similar technical problems.

As shown in FIG. 2, an embodiment of this application provides a communications system. For example, the communications system at least includes a terminal device 201, a RAN device 202, an AMF network element 205, an SMF network element 206, and a UPF network element 203.

The terminal device 201 in this system may be a terminal device supporting an LADN network. User equipment to which the present invention can be applied is not limited to a 5G network, and may be further applied to all kinds of terminal devices, including: a mobile phone, an internet of things device, a smart household device, an industrial control device, a vehicle device, and the like. The technical solutions provided in the embodiments of the present invention can be used provided that there is a requirement of the LADN network and there is a terminal device having the foregoing technical problem. The terminal device may also be referred to as a user equipment (UE) mobile station, a mobile station, a remote station, a remote terminal, an access terminal, a user terminal, a user agent, or user equipment (User Equipment). This is not limited herein. The foregoing terminal device may alternatively be a vehicle in vehicle-to-vehicle (V2V) communication or a machine in machine type communication, or the like.

The RAN device 202 in this system is an apparatus configured to provide a wireless communication function for the terminal device 201. The RAN device may include base stations in various forms, for example, a macro base station, a micro base station (also referred to as a small cell), a relay station, an access point, and the like. In systems that use different radio access technologies, a device that has a base station function may have different names. For example, in an LTE system, the device is referred to as an evolved NodeB (eNB or eNodeB), or in a 3rd generation (3G) system, the device is referred to as a NodeB (Node B). In a new generation system, the device is referred to as a gNB (gNodeB).

The UPF network element 203 can implement the user plane functions (SGW-U and PGW-U) of the SGW and the PGW. The UPF network element may be connected to a same data network 204 (DN) or different data networks 204 (DN), to implement data transmission of a service. The UPF network element may also be referred to as a UPF device or a UPF entity.

The AMF network element 205 may be responsible for attachment, mobility management, a tracking area update procedure, and the like of the terminal device. The AMF network element may also be referred to as an AMF device or an AMF entity.

The SMF network element 206 may be responsible for session management of the terminal device. For example, the session management includes selection of a user plane device, reselection of a user plane device, internet protocol (IP) address assignment, quality of service (QoS) control, and session setup, modification, or releasing. The SMF network element may also be referred to as an SMF device or an SMF entity.

Optionally, the communications system further includes a policy control function (policy control function, PCF) network element 207. The PCF network element 207 includes a policy control function and a flow-based charging control function. For example, the PCF network element 207 may implement a subscriber subscription data management function, a policy control function, a charging policy control function, and QoS control. The PCF network element may also be referred to as a PCF entity or a PCF device.

Optionally, the communications system further includes a data management device, for example, a unified data management (UDM) device 208. The UDM device 208 is configured to store subscription data of a subscriber, for example, subscription data related to mobility management and subscription data related to session management. The UDM device may also be referred to as a UDM entity or a UDM network element.

The communications system is used as an example in the following, to describe the technical solutions of this application in detail by using some embodiments. The following several embodiments may be combined with each other, and a same or similar concept or process may not be described repeatedly in some embodiments.

Figure 3:
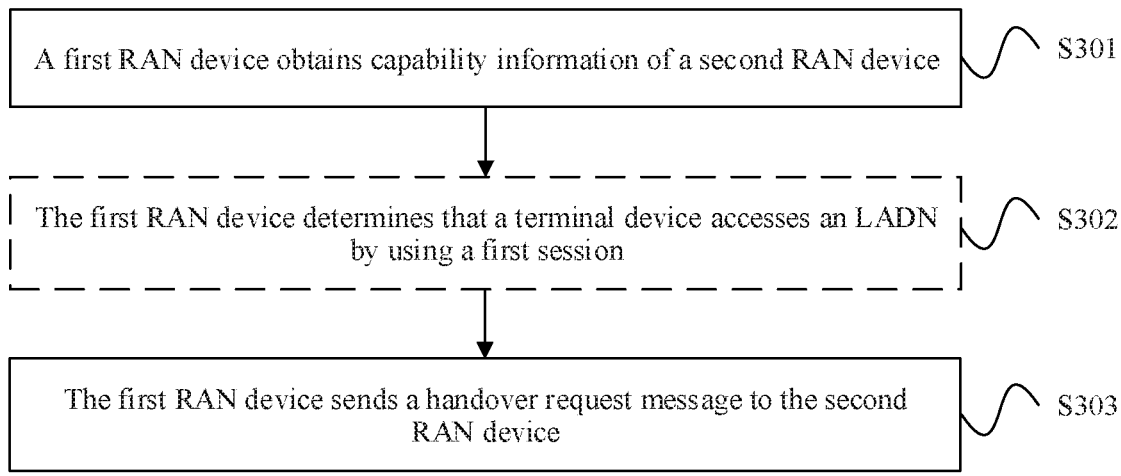
FIG. 3 is a flowchart of a method for selecting a radio access network device according to an embodiment of this application.

FIG. 3 is a flowchart of a method for selecting a radio access network device according to an embodiment of this application. The method may be applied to a scenario of handing over a RAN device for a terminal device by using a 3GPP access network. The method is performed by a first RAN device. For example, the first RAN device is the RAN device 201 in FIG. 2. As shown in FIG. 3, the method may include the following steps.

S301: A first RAN device obtains capability information of a second RAN device. The capability information of the second RAN device is used to indicate an LADN supported by the second RAN device.

For example, the capability information includes at least one of a data network name (DNN), a DNN index, an IP address or prefix, or IP routing information of the LADN. In other words, when the capability information of the second RAN device includes at least one of the DNN, the DNN index, the IP address or prefix, or the IP routing information of the LADN, the second RAN device is a RAN device supporting the LADN.

Optionally, when a coverage area of the LADN supported by the second RAN device is in a granularity of a tracking area (TA), the capability information of the second RAN device may include a correspondence between a tracking area identifier and at least one of a DNN, a DNN index, an IP address or prefix, or IP routing information of the LADN.

Alternatively, when a coverage area of the LADN supported by the second RAN device is in a granularity of a cell (that is, only a specific cell of the second RAN device supports the LADN), the capability information of the second RAN device may include a correspondence between a cell identifier and at least one of a DNN, a DNN index, an IP address or prefix, or IP routing information of the LADN.

It should be noted that the first RAN device may obtain capability information of a plurality of RAN devices adjacent to the first RAN device. The obtained capability information of the RAN devices at least includes the capability information of the second RAN device. In addition, the first RAN device may further obtain capability information of another RAN device supporting the LADN.

Optionally, when an adjacent RAN device does not feed back capability information to the first RAN device, it may be considered that the adjacent RAN device does not support the LADN.

A manner in which the first RAN device obtains the capability information of the second RAN device is further described with reference to FIG. 4.

S303: The first RAN device sends a handover request message to the second RAN device.

After obtaining the capability information of the second RAN device, the first RAN device knows that the second RAN device is a RAN device supporting the LADN. When the first RAN device determines that a handover is performed for terminal device, the first RAN device may select the second RAN device as a handover target based on the capability information of the second RAN device, and send the handover request message to the second RAN device.

Optionally, when the coverage area of the LADN supported by the second RAN device is in the granularity of the cell, the first RAN device selects, based on a cell identifier in the capability information, a cell supporting the LADN of the second RAN device as a target cell for the handover, and sends a handover request to the target cell.

Step S303 is further described with reference to FIG. 7.

Therefore, according to the method in the embodiment of the present invention, when a mobile handover is performed for the terminal device, the first RAN device (namely, a source RAN device) may send, based on the obtained capability information of the plurality of adjacent RAN devices, a handover request to the second RAN device supporting the LADN, so that a mobile terminal can access an LADN service after accessing the second RAN device, thereby improving user experience. The present invention may be applied to a scenario in which the terminal device does not access the LADN before the handover, or may be applied to a scenario in which the terminal device accesses the LADN before the handover.

Optionally, before step 303, the first RAN device may perform the following S302.

S302: The first RAN device determines that the terminal device accesses the LADN by using a first session.

For example, before the handover, the terminal device accesses a specific LADN by using the first session. For example, the specific LADN is an LADN 1, and a network name of the LADN 1 is a DNN 1. After making a handover decision, the first RAN device determines that the terminal device accesses the LADN 1 by using the first session. For example, because the first RAN device stores an association between an identifier of the first session and the DNN 1 of the LADN 1, the first RAN device may determine that the terminal device accesses the LADN 1 by using the first session.

The first RAN device may select a handover target based on the DNN 1 and the obtained capability information of the RAN devices. For example, the capability information of the second RAN device includes the DNN 1, indicating that the second RAN device supports the LADN 1 corresponding to the DNN 1. Therefore, the first RAN device may select the second RAN device that can also support the LADN 1 as the handover target, and sends the handover request message to the second RAN device. If the obtained capability information of the RAN devices does not include the DNN 1, the first RAN device may select a handover target RAN device from candidate RAN devices with reference to the prior art.

Therefore, based on the foregoing solution, when the terminal device accesses a specific LADN by using the first session, the first RAN device may send a handover request to a second RAN device supporting the specific LADN, so that the first session is not interrupted or suspended after a mobile terminal accesses the second RAN device. In this way, a service accessing the specific LADN is not interrupted or suspended, thereby further improving user experience.

Optionally, the method further includes any one of the following two implementations, to obtain an association between an identifier of the first session and a network name of the LADN.

In a possible implementation, the first RAN device receives the association between the session identifier of the first session and the network name of the LADN from an SMF network element (for example, the SMF network element 206 in FIG. 2). In this implementation, the SMF network element may determine the association between the session identifier of the first session and the network name of the LADN. Alternatively, the SMF network element obtains the association between the session identifier of the first session and the network name of the LADN from an AMF network element (for example, the AMF network element 205 in FIG. 2) or a PCF network element (for example, the PCF network element 207 in FIG. 2).

In another possible implementation, the first RAN device receives a network name corresponding to the first session from an SMF network element. In this implementation, the first RAN device determines the association between the session identifier of the first session and the network name of the LADN.

Optionally, the first RAN device may further store the association between the session identifier of the first session and the network name of the LADN. The foregoing implementations are further described with reference to FIG. 5 and FIG. 6.

Figure 4:
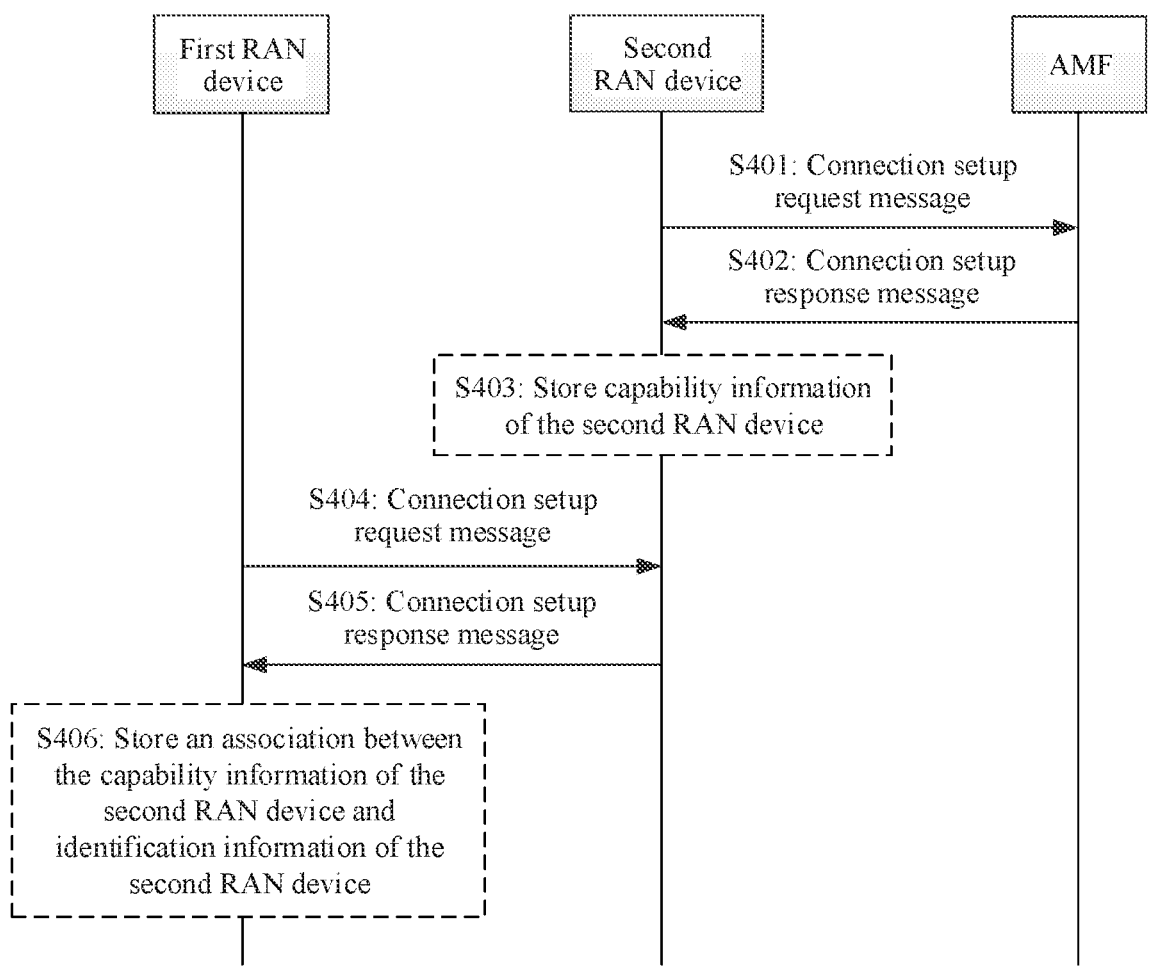
FIG. 4 shows a communication method according to an embodiment of this application.

FIG. 4 shows a communication method according to an embodiment of this application. As shown in FIG. 4, the method may include the following steps.

S401: A second RAN device sends a connection setup request message to an AMF network element. Correspondingly, the AMF network element receives the connection setup request message from the second RAN device.

The connection setup request message is used to request to set up a device connection between the second RAN device and the AMF network element. This may occur when the device is powered on. Specifically, the connection between the second RAN device and the AMF may be an N2 connection. For example, the connection setup request message may be an NG setup request message.

S402: After receiving the connection setup request message, the AMF network element sends a connection setup response message to the second RAN device. Correspondingly, the second RAN device receives the connection setup response message from the AMF network element. The connection setup response message includes capability information of the second RAN device. The capability information is used to indicate an LADN supported by the second RAN device.

For example, the connection setup response message may be an NG setup response message.

For example, after receiving the connection setup request message, the AMF network element searches for the capability information of the second RAN device. A manner in which the AMF network element obtains the capability information of the second RAN device includes any one of the following:

In a possible implementation, capability information of RAN devices (including the capability information of the second RAN device) is preconfigured on the AMF network element. For example, capability information of an AMF (in other words, an LADN supported by the AMF device and an SA corresponding to the LADN) is configured in the AMF network element. The RAN devices may report respective location information to the AMF device, and the AMF device determines, based on the location information reported by the RAN devices and a distribution status of the SA of the LADN, an LADN supported by the RAN devices, in other words, determines the capability information of the RAN devices. For example, the connection setup request message carries location information of the second RAN device. After receiving the connection setup request message, the AMF network element determines the LADN supported by the second RAN device, and sends the capability information of the second RAN device to the second RAN device by using the connection setup response message.

In another possible implementation, the AMF network element obtains capability information of RAN devices (including the capability information of the second RAN device) from a PCF network element (for example, the PCF network element 207 in FIG. 2) in a process of setting up a connection (for example, an N15 connection) between the AMF network element and the PCF network element.

In addition, the AMF network element may alternatively obtain the capability information of the second RAN device in another manner. This is not limited in this application.

For example, the foregoing steps S401 and S402 may be performed when the second RAN device is powered on.

In this way, the second RAN device completes setup of a connection to the AMF network element, and obtains the capability information of the second RAN device from the AMF network element. The capability information of the second RAN device may be used in a scenario in which a handover is performed for the terminal device, and is further applicable to another communication application scenario. This is not limited in the present invention.

Optionally, in S403, after receiving the connection setup response message from the AMF network element, the second RAN device stores the capability information of the second RAN device.

Further, after obtaining the capability information of the second RAN device, the second RAN device may send the capability information to a first RAN device. The specific process is as follows.

S404: The first RAN device sends a connection setup request message to the second RAN device. Correspondingly, the second RAN device receives the connection setup request message from the first RAN device.

The connection setup request message is used to request to set up a device connection between the first RAN device and the second RAN device. This may occur when the device is powered on. For example, the connection between the first RAN device and the second RAN device may be an Xn connection. For example, the connection setup request message may be an Xn setup request message.

S405: After receiving the connection setup request message sent by the first RAN device, the second RAN device sends a connection setup response message to the first RAN device. Correspondingly, the first RAN device receives the connection setup response message from the second RAN device. The connection setup response message includes the capability information of the second RAN device obtained by the second RAN device. For example, the connection setup response message may be an Xn setup response message.

S406: After receiving the connection setup response message from the second RAN device, the first RAN device stores an association between the capability information of the second RAN device and identification information of the second RAN device. The identification information of the second RAN device is used to indicate the second RAN device.

In this way, the first RAN device completes setup of a connection to the second RAN device, and obtains the capability information of the second RAN device from the second RAN device. Similarly, the first RAN device may obtain capability information of another adjacent RAN through a connection setup process between RAN devices. The method is not limited to an application scenario of the embodiment of this application, and is further applicable to another communication application scenario.

Based on the foregoing solution, the second RAN device obtains the capability information of the second RAN device from the AMF network element, and sends the capability information to the first RAN device. In this way, after the first RAN device obtains the capability information, and when a handover target is selected for the terminal device, a RAN device (for example, the second RAN device) supporting the LADN may be preferentially handed over for the terminal device, so that the terminal device can access an LADN service after the handover, thereby improving user experience.

Optionally, the first RAN device may also obtain capability information of the first RAN device in a manner similar to S401 and S402. In addition, in step S404, the connection setup request message sent by the first RAN device to the second RAN device may further carry the capability information of the first RAN device. In other words, in a process of setting up a connection between two RAN devices, the two RAN devices may notify each other of capability information of the two RAN devices, that is, notify each other of network names of LADNs respectively supported by the two RAN devices.

Figure 5:
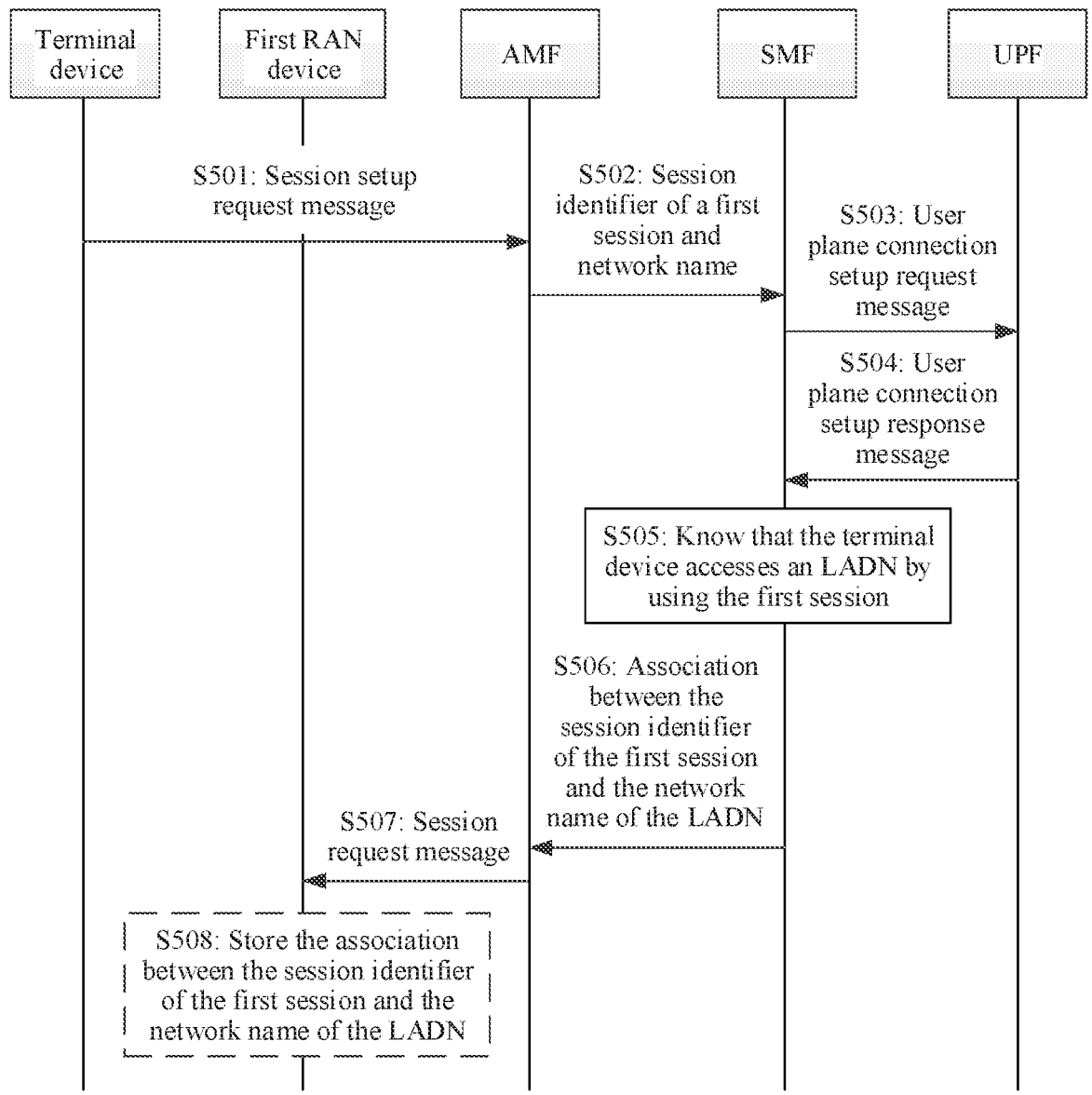
FIG. 5 shows another communication method according to an embodiment of this application.
Figure 6:
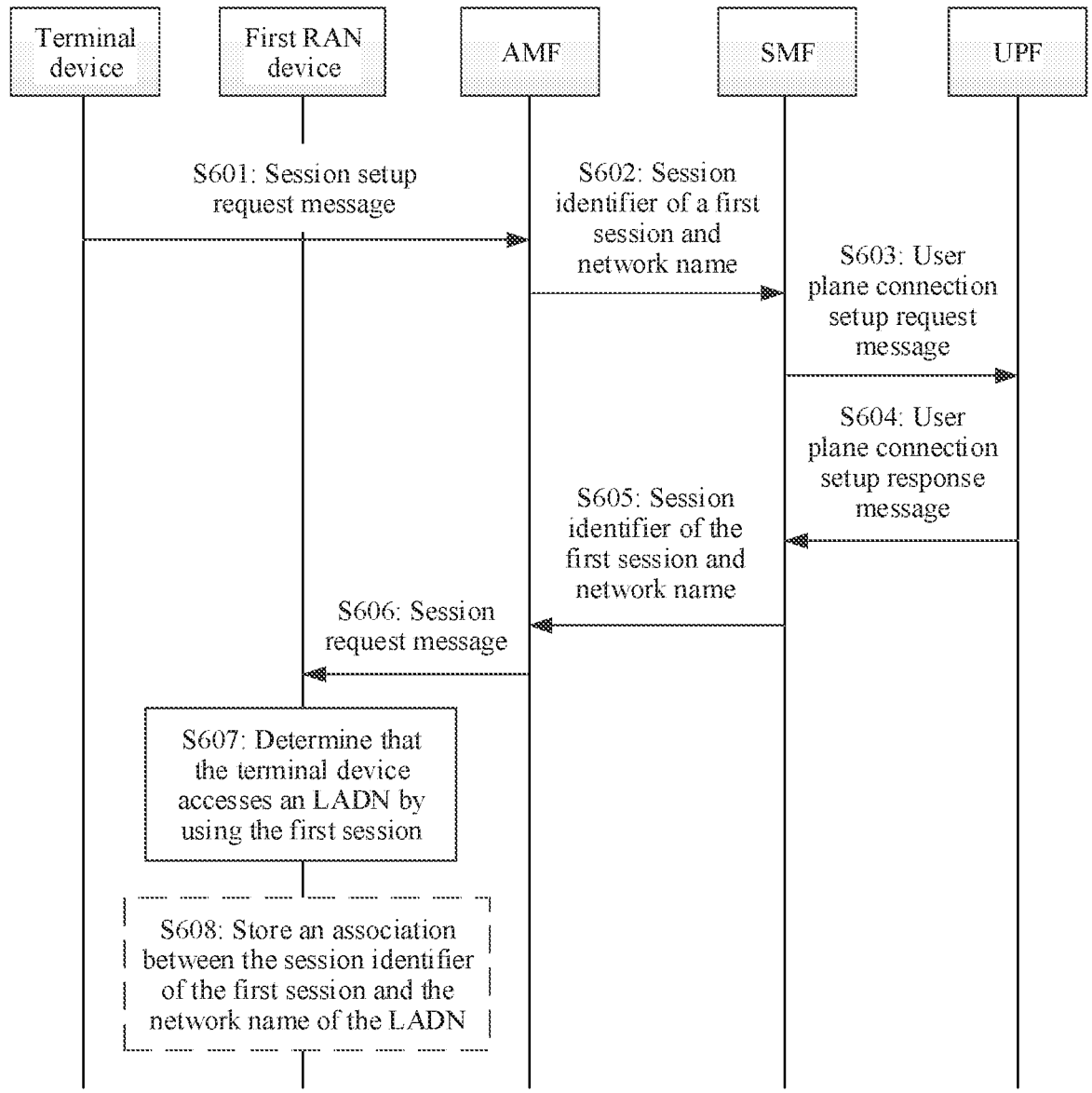
FIG. 6 shows another communication method according to an embodiment of this application.

FIG. 5 and FIG. 6 respectively show still another communication method according to an embodiment of this application. The method in FIG. 5 or FIG. 6 may be performed in a session (for example, a first session) setup procedure. The difference lies in that: in an example in FIG. 5, an SMF network element determines an association between a session identifier of the first session and a network name of an LADN. However, in an example in FIG. 6, a first RAN device determines an association between a session identifier of the first session and a network name of an LADN.

As shown in FIG. 5, the method may include the following steps.

S501: A terminal device sends a session setup request message to an AMF network element by using a first RAN device. Correspondingly, the AMF network element receives the session setup request message from the first RAN device. The session setup request message is used to request to set up a first session. For example, the terminal device sends a non-access stratum (NAS) message to the AMF network element. The NAS message includes a session identifier (session ID) of the first session, a network name, and session management (SM) information (for example, N1 SM information). The session management information includes the session setup request message.

For example, the network name includes at least one of a DNN, a DNN index, an IP address or prefix, or IP routing information.

S502: After receiving the session setup request message, the AMF network element selects an SMF network element, and sends the session identifier of the first session, the network name, and the session management information to the SMF network element.

S503: After receiving the session identifier of the first session, the network name, and the session management information, the SMF network element selects a UPF network element, and sends a user plane connection setup request message to the UPF network element, to set up a connection (for example, an N4 connection) between the SMF network element and the UPF network element. Correspondingly, the UPF network element receives the user plane connection setup request message from the SMF network element. For example, the user plane connection setup request message may be an N4 session setup request message.

S504: After receiving the user plane connection setup request message, the UPF network element sends a user plane connection setup response message to the SMF network element. Correspondingly, the SMF network element receives the user plane connection setup response message from the UPF network element. For example, the user plane connection setup response message may be an N4 session setup response message.

S505: The SMF network element knows that the terminal device accesses an LADN by using the first session.

For example, the SMF network element may obtain that the terminal device accesses the LADN by using the first session in any one of the following manners.

Manner 1: The SMF network element determines that the terminal device accesses the LADN by using the first session.

For example, the SMF network element determines, based on the network name carried in step S502 and an obtained network name corresponding to the LADN, whether the terminal device accesses the LADN by using the first session. For example, if the obtained network name corresponding to the LADN includes the network name carried in step S502, the SMF network element determines that the terminal device accesses the LADN by using the first session.

For example, the SMF network element may obtain the network name corresponding to the LADN in any one of the following manners.

(a1) The network name corresponding to the LADN is preconfigured in the SMF network element.

(a2) The SMF network element obtains the network name corresponding to the LADN from the AMF network element.

(a3) The SMF network element obtains the network name corresponding to the LADN from a PCF network element.

(a4) The SMF network element obtains the network name corresponding to the LADN from a data management device (for example, the UDM device 208 in FIG. 2).

In addition, the SMF network element may alternatively obtain the network name corresponding to the LADN in another manner. This is not limited in this application.

Manner 2: The SMF network element knows that the terminal device accesses the LADN by using the first session from the AMF network element.

For example, the network name corresponding to the LADN is preconfigured in the AMF network element. The AMF network element may determine, based on the network name carried in step S501 and the preconfigured network name corresponding to the LADN, whether the terminal device accesses the LADN by using the first session. For example, if the preconfigured network name corresponding to the LADN includes the network name carried in step S501, the AMF network element determines that the terminal device accesses the LADN by using the first session. The AMF network element may send, to the SMF network element, indication information used to instruct the terminal device to access the LADN by using the first session, so that the SMF network element knows, based on the indication information, that the terminal device accesses the LADN by using the first session.

Manner 3: The SMF network element knows that the terminal device accesses the LADN by using the first session from the PCF network element.

For example, the SMF network element sends the network name carried in step S502 to the PCF network element, and the PCF network element determines, based on the network name sent by the SMF network element and the obtained network name corresponding to the LADN, whether the terminal device accesses the LADN by using the first session. For example, if the obtained network name corresponding to the LADN includes the network name sent by the SMF network element, the PCF network element determines that the terminal device accesses the LADN by using the first session. The PCF network element may send, to the SMF network element, indication information used to instruct the terminal device to access the LADN by using the first session, so that the SMF network element knows, based on the indication information, that the terminal device accesses the LADN by using the first session.

For example, the PCF network element may obtain the network name corresponding to the LADN in any one of the following manners.

(b1) The network name corresponding to the LADN is preconfigured in the PCF network element.

(b2) The PCF network element obtains the network name corresponding to the LADN from the AMF network element.

(b3) The PCF network element obtains the network name corresponding to the LADN from a UDM network element.

In any one of the manners mentioned above, the SMF network element knows that the terminal device accesses the LADN by using the first session.

Optionally, the SMF network element stores an association between a session identifier of the first session and a network name of the LADN. For example, if the session identifier of the first session is a session ID 1, and the network name of the LADN is a DNN 1, the SMF network element stores an association between the session ID 1 and the DNN 1, as shown in Table 1.

TABLE 1

| Session identifier | Network name |
| --- | --- |
| Session ID 1 | DNN 1 |

Optionally, when the terminal device simultaneously initiates a plurality of sessions, the SMF network element stores a plurality of groups of associations between the session identifier and the network name.

It should be noted that Table 1 is merely an example. The association between the session identifier and the network name of the LADN in this application is not limited to Table 1. All correspondences fall within the protection scope of this application provided that the correspondence indicates a correspondence between the session identifier and the network name of the LADN.

In addition, it should be noted that an execution time of step S505 is not limited in the present invention, and step S505 can be performed provided that the SMF obtains the network name in S502.

S506: After knowing that the terminal device accesses the LADN by using the first session, the SMF network element sends the association between the session identifier of the first session and the network name of the LADN to the AMF network element.

Optionally, the SMF network element sends SM information such as an N2 SM information to the AMF network element. The N2 SM information includes an association between the session identifier and a first network name of the LADN.

Optionally, if the SMF network element determines, in step S505, that a data network accessed by the terminal device by using the first session is not the LADN, the SMF network element does not need to send the association between the session identifier and the network name to the AMF network element/the first RAN device.

S507: After receiving the association between the session identifier of the first session and the first network name of the LADN, the AMF network element forwards a session request message to the first RAN device. The session request message includes the association between the session identifier of the first session and the first network name of the LADN. Correspondingly, the first RAN device receives the session request message from the AMF network element. For example, the session request message may be an N2 session request message.

Optionally, in S508, after receiving the association between the session identifier of the first session and the network name of the LADN, the first RAN device stores the association between the session identifier and the network name of the LADN. The association is used to select a handover target for the terminal device when a mobile handover is performed for the terminal device.

In this way, the first RAN device receives the association between the session identifier of the first session and the network name of the LADN from the SMF network element. After step S508, for performing subsequent steps of a session setup process, refer to the prior art. Details are not described herein again.

FIG. 6 shows still another communication method according to an embodiment of this application. An SMF network element is shown in FIG. 6. The method may include the following steps.

S601: A terminal device sends a session setup request message to an AMF network element by using a first RAN device. Correspondingly, the AMF network element receives the session setup request message from the first RAN device. The session setup request message is used to request to set up a first session.

S602: After receiving the session setup request message, the AMF network element selects an SMF network element, and sends a session identifier of the first session, a network name, and session management information to the SMF network element.

S603: After receiving the session identifier of the first session, the network name, and the session management information, the SMF network element selects a UPF network element, and sends a user plane connection setup request message to the UPF network element, to set up a connection between the SMF network element and the UPF network element. Correspondingly, the UPF network element receives the user plane connection setup request message from the SMF network element.

S604: After receiving the user plane connection setup request message, the UPF network element sends a user plane connection setup response message to the SMF network element. Correspondingly, the SMF network element receives the user plane connection setup response message from the UPF network element.

Steps S601 to S604 are the same as steps S501 to S504 in FIG. 5, and details are not described herein again.

S605: After receiving the session setup response message, the SMF network element sends the session identifier of the first session and the network name that are carried in step S602 to the AMF network element.

Optionally, the SMF network element sends SM information such as an N2 SM information to the AMF network element. The N2 SM information includes the session identifier and the network name. A difference between step S605 and step S506 in FIG. 5 lies in that, in an example in FIG. 5, the SMF network element sends the association between the session identifier and the network name of the LADN to the first RAN device only after knowing that the terminal device accesses the LADN by using the first session. However, in an example in FIG. 6, the SMF network element neither determines nor knows whether the terminal device accesses the LADN by using the first session, and the SMF network element may directly send the received session identifier and network name to the first RAN device, and then the first RAN device determines whether the network name is corresponding to the LADN.

S606: After receiving the session identifier and the network name, the AMF network element sends a session request message to the first RAN device. The session request message includes the session identifier and the network name.

For example, the session request message may be an N2 session request message.

S607: After receiving the session request message, the first RAN device determines that the terminal device accesses the LADN by using the first session.

For example, the first RAN device obtains capability information of the first RAN device in a manner similar to steps S401 and S402, to know the network name corresponding to the LADN. The first RAN device determines, based on the session identifier of the first session and the network name that are obtained in step S606, whether the terminal device accesses the LADN by using the first session. For example, if the obtained network name corresponding to the LADN includes the network name carried in step S606, the first RAN device determines that the terminal device accesses the LADN by using the first session.

Optionally, in S608, after determining that the terminal device accesses the LADN by using the first session, the first RAN device stores the association between the session identifier of the first session and the network name of the LADN. The association is used to select a handover target for the terminal device when a mobile handover is performed for the terminal device.

In this way, the first RAN device determines the association between the session identifier of the first session and the network name of the LADN from the SMF network element. After step S608, for performing subsequent steps of a session setup process, refer to the prior art. Details are not described herein again.

Figure 7:
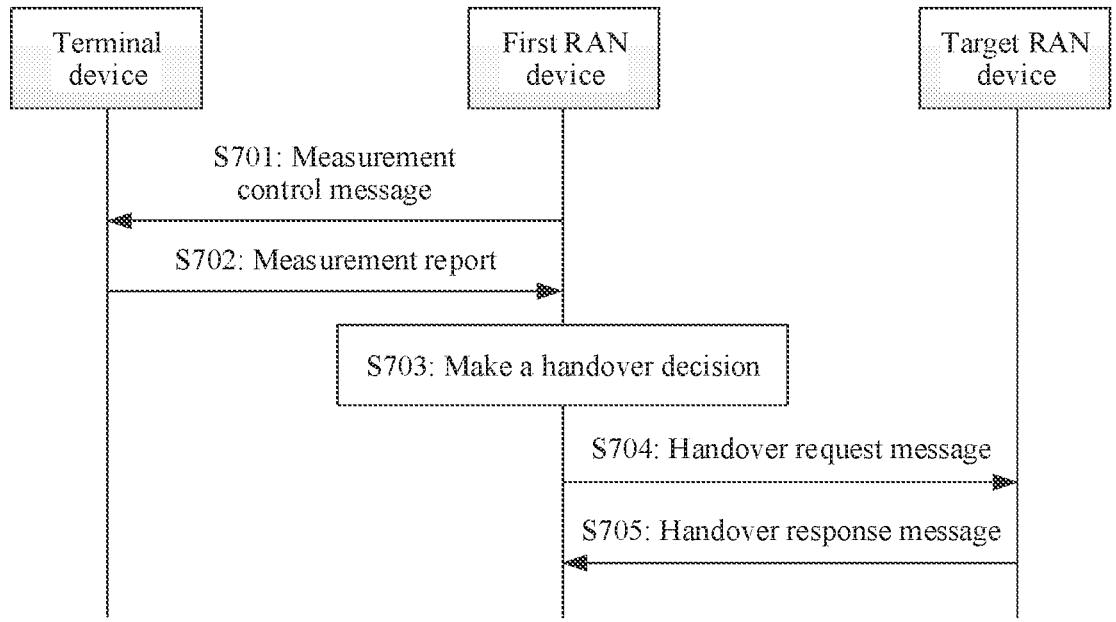
FIG. 7 shows a handover method according to an embodiment of this application.

FIG. 7 shows a handover method according to an embodiment of this application. As shown in FIG. 7, the method may include the following steps.

S701: A first RAN device sends measurement control information to a terminal device, to obtain a measurement report of the terminal device.

Optionally, the measurement control information may include at least one of an object that needs to be measured, a cell list, or a reporting mode.

S702: The terminal device performs measurement based on the received measurement control information, and then sends the measurement report to the first RAN device. The measurement report includes a candidate RAN device and a cell identifier within a coverage area of each RAN device in the candidate RAN devices.

The candidate RAN device is a RAN device that can be accessed by the terminal device. A quantity of candidate RAN devices is not limited in this application, and at least one RAN device in the candidate RAN devices supports an LADN service.

S703: The first RAN device makes a handover decision based on the received measurement report.

For example, after the first RAN device decides, based on the measurement report, to perform a handover for terminal device, the first RAN device searches, based on capability information of another RAN device obtained in a process of setting up a connection to the another RAN device, for whether there is a RAN device (for example, the second RAN device) supporting a LADN in the candidate RAN devices. In this way, the first RAN device selects the second RAN device as a handover target. Therefore, after accessing the second RAN device, a mobile terminal can access the LADN service, thereby improving user experience.

Optionally, after the first RAN device decides, based on the measurement report, to perform a handover for terminal device, the first RAN device first determines that the terminal device accesses the LADN by using a first session. For example, the first RAN device may determine, based on the obtained association between the session identifier of the first session and the network name of the LADN in the process in FIG. 5 or FIG. 6 that the terminal device accesses the LADN by using the first session. The first RAN device determines whether there is a RAN device (for example, the second RAN device) whose capability information includes the network name in the candidate RAN devices. The first RAN device may obtain capability information of the RAN devices by performing steps S401 to S406. If there is the RAN device whose capability information includes the network name in the candidate RAN devices, the first RAN device selects the RAN device as a handover target. Therefore, after the mobile terminal accesses the second RAN device, a service accessing a specific LADN is not interrupted or suspended, thereby further improving user experience.

Further, when a coverage area of the LADN supported by the RAN device is in a granularity of a cell, the first RAN device selects a cell that supports the LADN and that is of the RAN device as a target cell for the handover.

If there is no RAN device whose capability information includes the network name in the candidate RAN devices, a handover target may be selected from the candidate RAN devices with reference to the prior art.

For example, capability information of the candidate RAN devices stored in the first RAN device may be shown in the following Table 2.

TABLE 2

| Candidate RAN device | Capability information |
|---|---|
| ID 1 | DNN 1 |
| ID 2 | DNN 2, and cell identifier of a cell 1 |
| ID 3 | DNN 2, and DNN 3 |

As shown in the foregoing Table 2, the candidate RAN devices include a RAN 1, a RAN 2, a RAN 3, and a RAN 4. Identifiers of the RAN 1, the RAN 2, the RAN 3, and the RAN 4 are respectively an ID 1, an ID 2, an ID 3, and an ID 4. The first RAN device stores capability information of the four candidate RAN devices. For example, the capability information is a DNN. Capability information of the RAN 1 includes a DNN 1, indicating that the RAN 1 supports an LADN 1 corresponding to the DNN 1. Capability information of the RAN 2 includes a DNN 2 and a cell identifier of a cell 1, indicating that the LADN 2 uses a cell as a granularity and that the cell (cell 1) of the RAN 2 supports an LADN corresponding to the DNN 2. Capability information of the RAN 3 includes the DNN 2 and a DNN 3, indicating that the RAN 3 separately supports the LADN 2 corresponding to the DNN 2 and an LADN 3 corresponding to the DNN 3. In addition, because there is no capability information of the RAN 4 in the first RAN device, it may be considered that the RAN 4 does not support an LADN.

It is assumed that a network name corresponding to the first session of the terminal device is the DNN 1. When a mobile handover is performed for the terminal device, the first RAN device selects, based on the obtained capability information, the RAN 1 whose capability information includes the DNN 1 as a handover target.

Alternatively, if a network name corresponding to the first session of the terminal device is the DNN 2. When a mobile handover is performed for the terminal device, the first RAN device selects one RAN device as a handover target from the RAN 2 and the RAN 3 whose capability information includes the DNN 2. Further, when selecting the RAN 2 as a handover target, the first RAN device may further select the cell 1 as a target cell for the handover.

Alternatively, if a network name corresponding to the first session of the terminal device is a DNN 4. When a mobile handover is performed for the terminal device, there is no RAN device whose capability information includes the DNN 4 in the candidate RAN devices. In this case, the first RAN device preferentially selects the RAN 3 whose capability information includes the DNN 2 and the DNN 3 as a handover target. In this way, it can be ensured that after the mobile handover is performed for the terminal device, the terminal device can access the LADN 2 corresponding to the LADN 2 or the LADN 3 corresponding to the DNN 3, thereby improving user experience.

Alternatively, it is assumed that the first session of the terminal device is not an LADN session. In this scenario, the first RAN device may select a handover target with reference to the scenario in which the network name corresponding to the first session is the DNN 4. Details are not described herein again.

S704: The first RAN device sends a handover request to a target RAN (for example, the second RAN device).

S705: After receiving the handover request, the target RAN device performs handover processing such as parameter check and resource reservation. After the processing succeeds, the target RAN device sends a handover response message to the first RAN device.

In this way, a handover process from the first RAN device to the target RAN device is completed.

Figure 8:
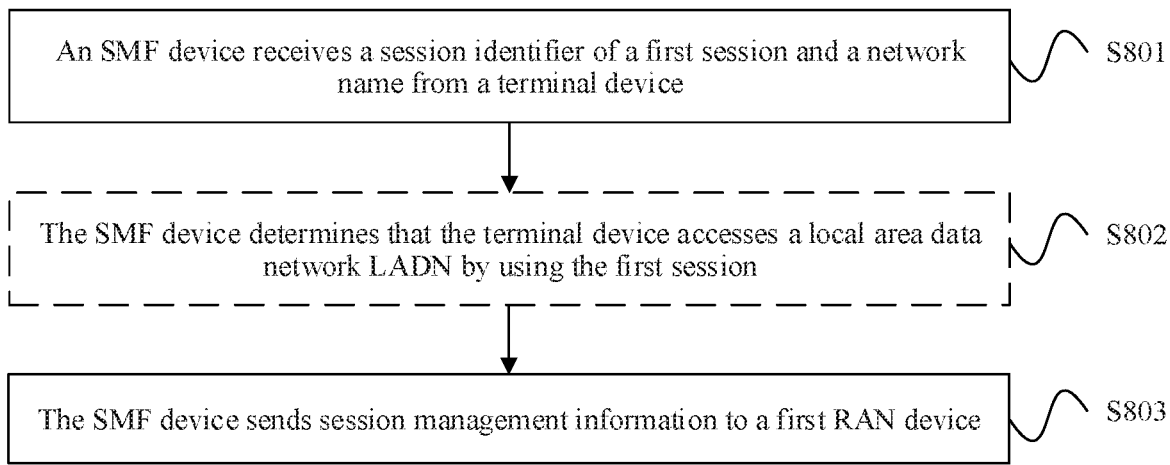
FIG. 8 shows another communication method according to an embodiment of this application.

FIG. 8 shows still another communication method according to an embodiment of this application. FIG. 8 is described with reference to FIG. 5 and FIG. 6. As shown in FIG. 8, the method may include the following steps.

S801: An SMF network element receives a session identifier of a first session and a network name from a terminal device.

The SMF may obtain the session identifier of the first session and the network name by using step S502 in FIG. 5 or step S602 in FIG. 6. Details are not described herein again.

S803: After receiving the session identifier of the first session and the network name, the SMF network element sends session management information to the first RAN device. The session management information includes an association between the session identifier of the first session and the network name.

For step S803, refer to the description of step S506 in FIG. 5 or the description of S605 in FIG. 6. Details are not described herein again.

Therefore, according to the method in the embodiment of this application, the first RAN device preferentially selects a RAN device supporting an LADN as a handover target, so that the terminal device can access the LADN by using a target RAN device, thereby improving user experience.

Optionally, before S803, the method may further include the following steps.

S802: After receiving the session identifier of the first session and the network name, the SMF network element determines that the terminal device accesses a local area data network LADN by using the first session.

For a specific process of determining, by the SMF network element, that the terminal device accesses the LADN by using the first session and a manner of obtaining, by the SMF network element, the network name corresponding to the LADN, refer to S505. Details are not described herein again.

Therefore, the first RAN device obtains the association between the session identifier of the first session and the network name, and when a mobile handover is performed for the terminal device, the first RAN device determines, based on the association, whether the terminal device has a session for accessing the LADN. When the terminal device has the session for accessing the LADN, the first RAN device selects a RAN device supporting the LADN as the handover target.

Figure 9:
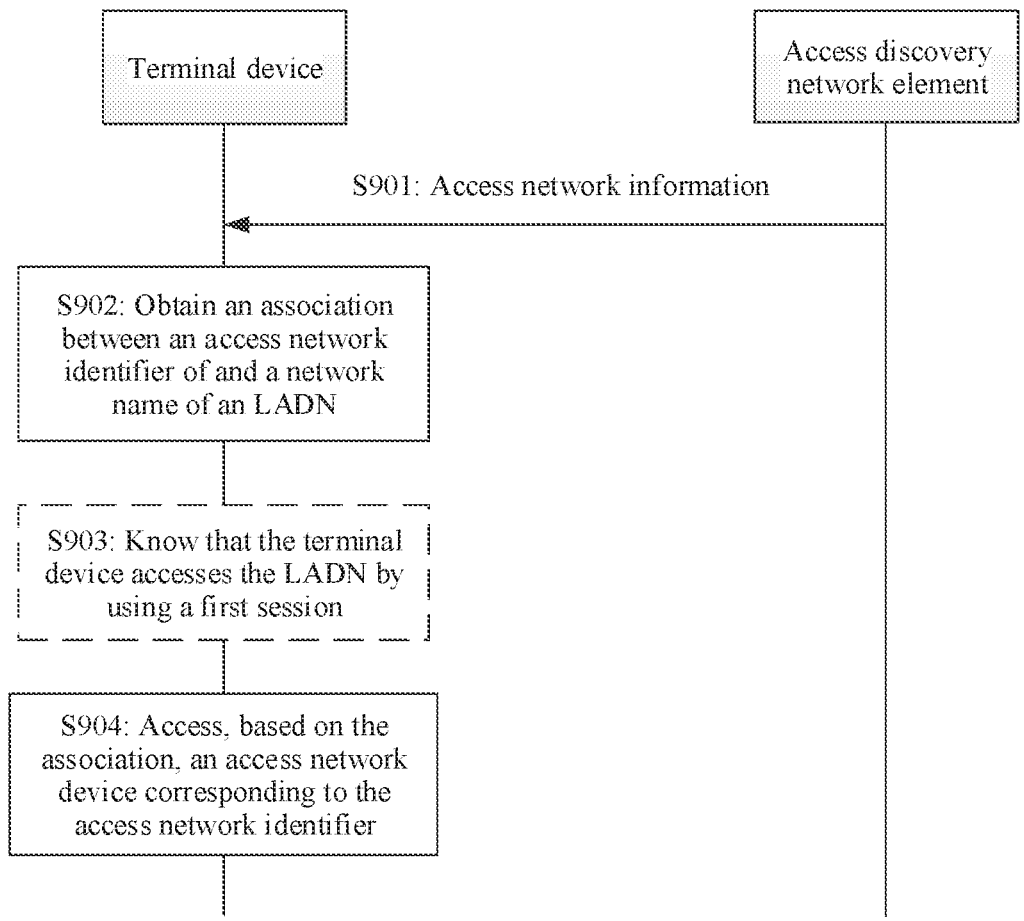
FIG. 9 is a specific flowchart of another method for selecting a radio access network device according to an embodiment of this application.

This application further provides a method for selecting a radio access network device. The method is applicable to a scenario of a non-3GPP access network. As shown in FIG. 9, the method may include the following steps.

S901: An access discovery network element sends access network information to a terminal device. Correspondingly, the terminal device receives the access network information from the access discovery network element. The access network information includes an association between an access network identifier and a network name of an LADN.

For example, the access discovery network element may be an access network discovery and selection function (ANDSF) network element in a 4th generation mobile communications system (4G), or may be a PCF network element (for example, the PCF network element 207 in FIG. 2) in a 5th generation mobile communications system (5G), or may be a network element that can provide access network information for a terminal device in a future communications system. This is not limited herein. There may be one or more access discovery network elements. A quantity of the access discovery network elements is not limited in this application either.

An access network identifier may be used to identify different access networks. For example, the access network identifier may be a service set identifier (SSID).

Optionally, the access network information further includes an access technology type of the access network. For example, the access technology type includes a wireless local area network (WLAN), a worldwide interoperability for microwave access network (WiMAX), or the like.

S902: After receiving the access network information, the terminal device obtains the association between the access network identifier and the network name of the LADN.

In this application, there may be one or more access discovery network elements. The terminal device may obtain one or a plurality of groups of associations between the access network identifier and the network name of the LADN. For example, in an implementation, the terminal device may obtain the plurality of groups of associations between the access network identifier and the network name of the LADN from one access discovery network element. In another implementation, the terminal device may obtain the plurality of groups of associations between the access network identifier and the network name of the LADN from a plurality of access discovery network elements. For example, the association between the access network identifier and the network name of the LADN obtained by the terminal device may be shown in the following Table 3.

TABLE 3

| Access network identifier | Network name |
|---|---|
| SSID 1 | DNN 1 |
| SSID 2 | DNN 2, and DNN 3 |

As shown in Table 3, the terminal device obtains two groups of associations between the access network identifier and the network name of the LADN. For example, the access network identifier is an SSID. Identifiers of an access network 1 and an access network 2 are respectively an SSID 1 and an SSID 2. Network names of an LADN 1, an LADN 2, and an LADN 3 are respectively a DNN 1, a DNN 2, and a DNN 3. The association between the access network identifier and the network name of the LADN in Table 3 represents that an access network 1 corresponding to the SSID 1 supports the LADN 1; and an access network 2 corresponding to the SSID 2 supports the LADN 2 and the LADN 3.

S904: The terminal device accesses, based on the association between the access network identifier and the network name of the LADN in S902, an access network device corresponding to the access network identifier.

According to the embodiment of the present invention, when the terminal device moves and needs to reselect a non-3GPP access network, the terminal device sends, based on the obtained association between the access network identifier and a network name of the LADN, an access request to the access network device corresponding to the access network identifier. Because the access network device corresponding to the access network identifier supports the LADN, the terminal device can access an LADN service after the access network is changed, thereby improving user experience. The embodiment of the present invention may be applied to a scenario in which the terminal device does not access the LADN before the access network of the terminal device is changed, or may be applied to a scenario in which the terminal device accesses the LADN before the access network of the terminal device is changed for the terminal device.

Optionally, before step S904, the terminal device performs S903.

S903: The terminal device knows that the terminal device accesses the LADN by using a first session.

In a possible implementation, for a process in which the SMF network element knows that the terminal device accesses the LADN by using the first session, refer to steps S501 to S505. Then, the SMF network element sends, to the terminal device by using the AMF network element and the RAN device, indication information used to instruct the terminal device to access the LADN by using the first session.

Optionally, if the SMF network element determines, in step S505, that a data network accessed by the terminal device by using the first session is not the LADN, the SMF network element does not need to send the network name to the terminal device. In another possible implementation, the terminal device may determine the LADN accessed by using the first session. For example, in a registration procedure, the terminal device obtains, from the AMF device, the network name corresponding to the LADN, and then performs matching the network name corresponding to the LADN with a network name of an LADN corresponding to the first session. If the network name corresponding to the LADN includes the network name of the LADN corresponding to the first session, or the network name corresponding to the LADN is the same as the network name of the LADN corresponding to the first session, the terminal device determines to access the LADN by using the first session.

Therefore, in step S904, when the terminal device accesses a specific LADN by using the first session, the terminal device may send, by knowing that the terminal device accesses the LADN by using the first session and based on the association between the access network identifier and the network name of the LADN that are obtained by the terminal device, a access request to a non-3GPP access network device that supports the specific LADN and that is corresponding to the access network identifier. Therefore, after the terminal device accesses the access network device, a service accessing the specific LADN is not interrupted, thereby further improving user experience.

For example, the terminal device knows, in step S903, that the network name of the LADN accessed by the terminal device by using the first session is the DNN 1, and the terminal device obtains, in step S902, an association between the identifier SSID 1 and the DNN 1, where the DNN 1 is corresponding to the LADN 1. In this case, the terminal device selects and accesses an access network device, supporting the LADN 1, whose identifier is the SSID 1.

Therefore, based on the foregoing solution, in a scenario of the non-3GPP access network, the terminal device may access, by knowing a network name of a specific LADN that is accessed by the terminal device by using the first session and based on an obtained association between an identifier of a candidate access network that can be accessed and the network name of the LADN, an access network device supporting the specific LADN. Therefore, after the terminal device accesses the access network, a specific LADN service is not interrupted, thereby improving user experience. In the foregoing embodiments provided in this application, the solutions of the method for selecting the radio access network device provided in the embodiments of this application are separately described from a perspective of the network elements and from a perspective of interaction between the network elements. It may be understood that, to implement the foregoing functions, the network elements such as the radio access network device, the communications apparatus, or the terminal device include corresponding hardware structures and/or software modules for performing the functions. A person skilled in the art should easily be aware that, in combination with the examples described in the embodiments disclosed in this specification, units, and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 10A:
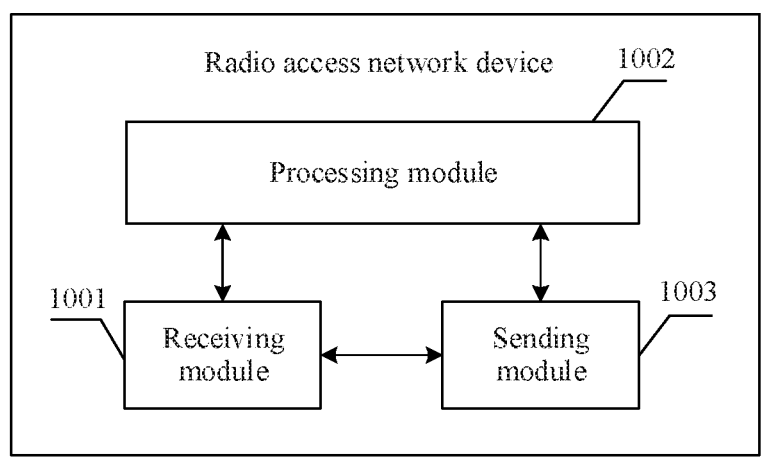
FIG. 10A and FIG. 10B are schematic structural diagrams of a radio access network device according to an embodiment of the present invention.

For example, when the foregoing network elements implement the corresponding functions by using the software modules, a radio access network device may include a receiving module 1001 and a sending module 1003, as shown in FIG. 10A. Optionally, the radio access network device further includes a processing module 1002. The radio access network device may be configured to perform operations of the first RAN device in FIG. 3 to FIG. 8. For example, the receiving module 1001 is configured to receive capability information of a second RAN device from the second RAN device, where the capability information is used to indicate a local area data network LADN supported by the RAN device; and the sending module 1003 is configured to send a handover request message to the second RAN device.

Therefore, when a mobile handover is performed for a terminal device, the radio access network device may send, based on obtained capability information of a plurality of adjacent RAN devices, a handover request to the second RAN device supporting the LADN, so that a mobile terminal can access an LADN service after accessing the second RAN device, thereby improving user experience.

Optionally, the sending module 1003 is configured to send a connection setup request message to the second RAN device; and the receiving module is configured to receive a connection setup response message from the second RAN device, where the connection setup response message includes the capability information of the second RAN device.

Optionally, before the sending module 1003 sends the handover request message to the second RAN device, the processing module 1002 is configured to determine that a terminal device accesses the LADN by using a first session.

Optionally, the receiving module 1001 is further configured to receive an association between a session identifier of the first session and a first network name of the LADN from a session management function SMF network element; or the receiving module 1001 is further configured to receive a second network name from an SMF network element, and the processing module 1002 is further configured to determine that the second network name is corresponding to the LADN.

Therefore, when the terminal device accesses a specific LADN by using the first session, the first RAN device may send a handover request to a second RAN device supporting the specific LADN, so that the first session is not interrupted or suspended after a mobile terminal accesses the second RAN device. In this way, a service accessing the specific LADN is not interrupted or suspended, thereby further improving user experience.

In addition, the receiving module 1001, the processing module 1002, and the sending module 1003 in the radio access network device may further implement other operations or functions of the first RAN device in the foregoing methods. Details are not described herein again.

Figure 10B:
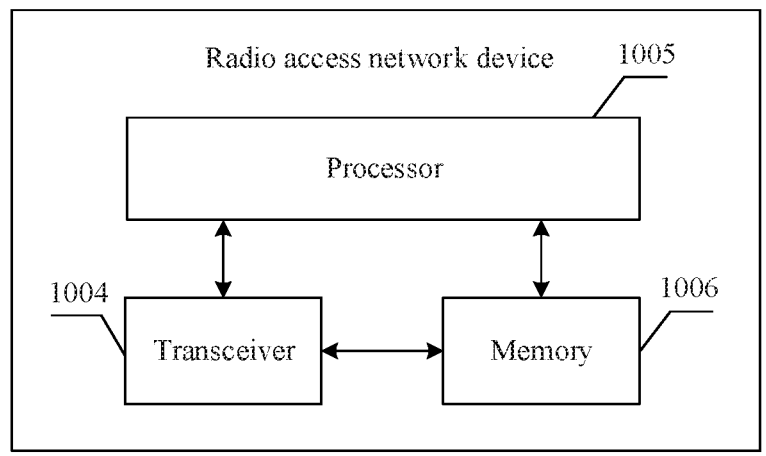

FIG. 10B is another possible schematic structural diagram of a radio access network device in the foregoing embodiments. As shown in FIG. 10B, the radio access network device includes a transceiver 1004 and a processor 1005. For example, the processor 1005 is configured to support the radio access network device in performing a corresponding function of the first RAN device in the foregoing method. The transceiver 1004 is configured to implement communication between the first RAN device and an access and mobility management function network element/another radio access network device (for example, a second RAN device). The radio access network device may further include a memory 1006. The memory is configured to be coupled to the processor, and the memory stores a program instruction and data that are necessary for the radio access network device.

Figure 11A:
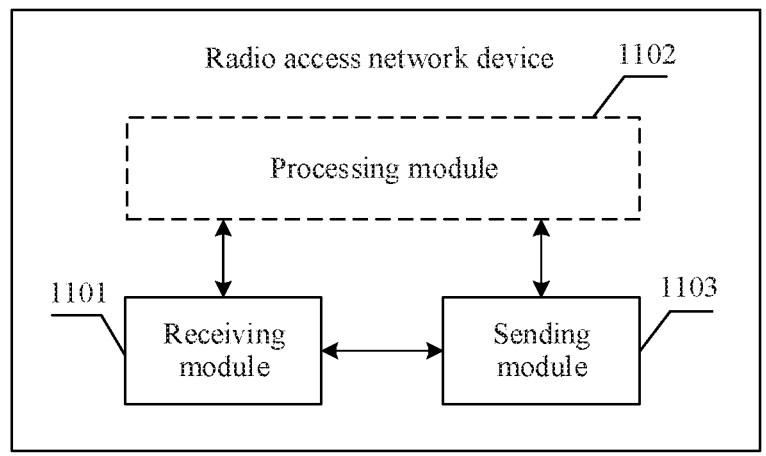
FIG. 11A and FIG. 11B are schematic structural diagrams of another radio access network device according to an embodiment of the present invention.

As shown in FIG. 11A, a radio access network device may include a receiving module 1101 and a sending module 1103. Optionally, the radio access network device further includes a processing module 1102. The radio access network device may be configured to perform operations of the second RAN device in FIG. 3, FIG. 4, and FIG. 7. For example, the receiving module 1101 is configured to receive capability information of the radio access network device from an AMF network element, where the capability information is used to indicate a local area data network LADN supported by the radio access network device; and the sending module 1103 is configured to send the capability information to a first RAN device.

Therefore, the radio access network device sends the capability information of the radio access network device obtained from the AMF network element to the first RAN device. After the first RAN device obtains the capability information, and when a handover target is selected for a terminal device, a RAN device (for example, the second radio access network device) supporting the LADN may be preferentially handed over the terminal device, so that the terminal device can access an LADN service after the handover, thereby improving user experience.

Optionally, the receiving module 1101 is configured to receive the capability information of the radio access network device from the AMF network element in a process of setting up a connection between the radio access network device and the AMF network element.

Optionally, the receiving module 1101 is configured to receive a connection setup request message from the first RAN device; and the sending module 1103 is configured to send a connection setup response message to the first RAN device, where the connection setup response message includes the capability information.

In addition, the receiving module 1101, the processing module 1102, and the sending module 1103 in the radio access network device may further implement other operations or functions of the second RAN device in the foregoing methods. Details are not described herein again.

Figure 11B:
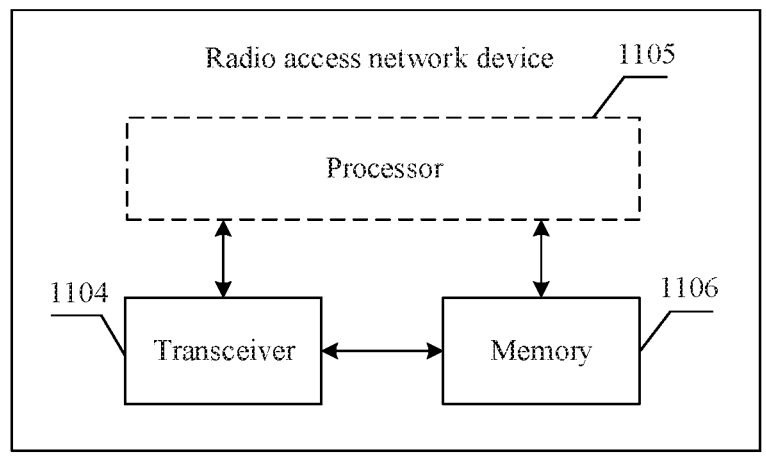

FIG. 11B is another possible schematic structural diagram of a radio access network device in the foregoing embodiments. As shown in FIG. 11B, the radio access network device includes a transceiver 1104 and a processor 1105. For example, the processor 1105 is configured to support the radio access network device in performing a corresponding function of the second RAN device in the foregoing method. The transceiver 1104 is configured to implement communication between the second RAN device and an access and mobility management function network element/another radio access network device (for example, a first RAN device). The radio access network device may further include a memory 1106. The memory is configured to be coupled to the processor, and the memory stores a program instruction and data that are necessary for the radio access network device.

Figure 12A:
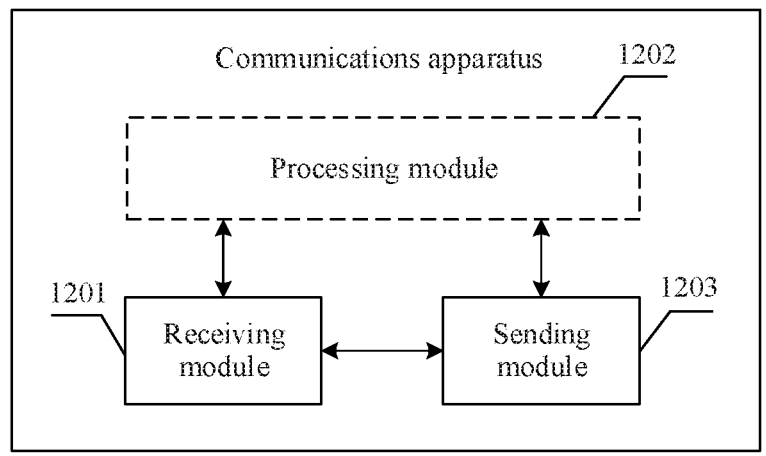
FIG. 12A and FIG. 12B are schematic structural diagrams of a communications apparatus according to an embodiment of the present invention.

As shown in FIG. 12A, a communications apparatus may include a receiving module 1201 and a sending module 1203. Optionally, the communications apparatus further includes a processing module 1202. The communications apparatus may be configured to perform operations of the AMF network element in FIG. 4. For example, the receiving module 1201 is configured to receive a connection setup request message from a RAN device; and the sending module 1203 is configured to send capability information of the RAN device to the RAN device, where the capability information is used to indicate an LADN supported by the RAN device.

Therefore, the communications apparatus completes setup of a connection to the RAN device, and sends the capability information of the RAN device to the RAN device. The capability information may be used in a scenario in which a handover is performed for a terminal device. In addition, the capability information is further applicable to another communication application scenario.

Optionally, the capability information includes at least one of a data network name DNN, an internet protocol IP address or prefix, or IP routing information of the LADN. Therefore, the capability information of the RAN device may be used to represent the LADN supported by the RAN device.

Optionally, the capability information includes a correspondence between a cell identifier or a tracking area identifier and at least one of a DNN, an IP address or prefix, or IP routing information of the LADN.

In addition, the receiving module 1201, the processing module 1202, and the sending module 1203 in the communications apparatus may further implement other operations or functions of the AMF in the foregoing methods. Details are not described herein again.

Figure 12B:
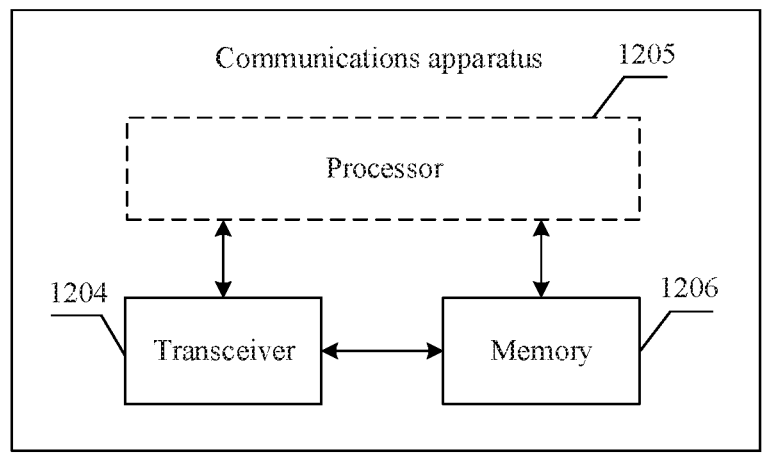

FIG. 12B is another possible schematic structural diagram of a communications apparatus in the foregoing embodiments. As shown in FIG. 12B, the communications apparatus includes a transceiver 1204 and a processor 1205. For example, the processor 1205 is configured to support the communications apparatus in performing a corresponding function of the AMF network element in the foregoing method. The transceiver 1204 is configured to implement communication between the AMF network element and a terminal device/a radio access network device/a session management function network element. The communications apparatus may further include a memory 1206. The memory is configured to be coupled to the processor, and the memory stores a program instruction and data that are necessary for the communications apparatus.

Figure 13A:
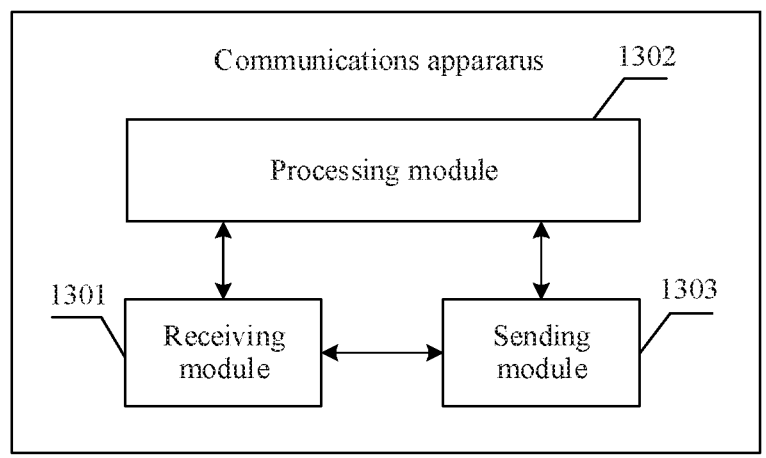
FIG. 13A and FIG. 13B are schematic structural diagrams of another communications apparatus according to an embodiment of the present invention.

As shown in FIG. 13A, a communications apparatus may include a receiving module 1301 and a sending module 1303. Optionally, the communications apparatus further includes a processing module 1302. The communications apparatus may be configured to perform operations of the SMF network element in FIG. 5, FIG. 6, and FIG. 8. For example, the receiving module 1301 is configured to receive a session identifier of a first session and a network name from a terminal device; and the sending module 1303 is configured to send session management information to a radio access network RAN device, where the session management information includes an association between the session identifier and the network name.

Based on the foregoing solution, the first RAN device preferentially selects a RAN device supporting an LADN as a handover target, so that the terminal device can access the LADN by using a target RAN device, thereby improving user experience.

Optionally, the processing module 1302 is configured to determine that a terminal device accesses the LADN by using a first session. Based on the foregoing solution, when the terminal device accesses a specific LADN by using the first session, the first RAN device may send a handover request to a second RAN device supporting the specific LADN, so that the first session is not interrupted or suspended after a mobile terminal accesses the second RAN device. In this way, a service accessing the specific LADN is not interrupted or suspended, thereby further improving user experience.

Optionally, the processing module 1302 is configured to preconfigure the network name corresponding to the LADN; or the receiving module 1301 is configured to receive the network name corresponding to the LADN from an AMF network element; or the receiving module 1301 is further configured to receive the network name corresponding to the LADN from a PCF network element; or the receiving module 1301 is further configured to receive the network name corresponding to the LADN from a data management network element.

In addition, the receiving module 1301, the processing module 1302, and the sending module 1303 in the communications apparatus may further implement other operations or functions of the SMF in the foregoing methods. Details are not described herein again.

Figure 13B:
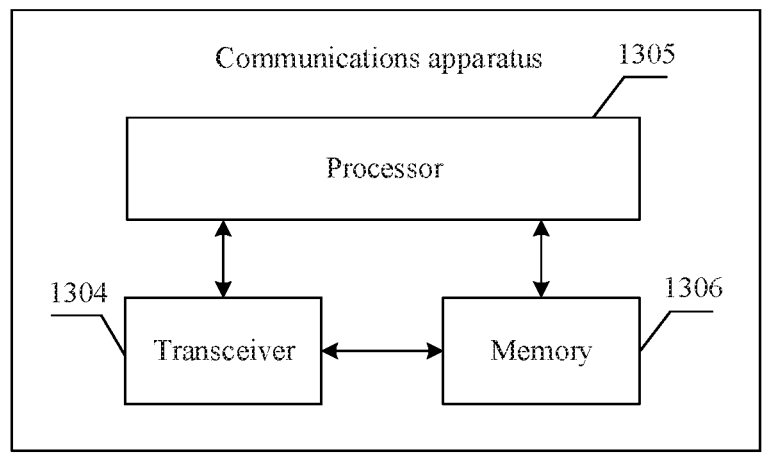

FIG. 13B is another possible schematic structural diagram of a communications apparatus in the foregoing embodiments. As shown in FIG. 13B, the communications apparatus includes a transceiver 1304 and a processor 1305. For example, the processor 1305 is configured to support the communications apparatus in performing a corresponding function of the SMF network element in the foregoing method. The transceiver 1304 is configured to implement communication between the SMF network element and a terminal device/a radio access network device/an access and mobility management function network element. The communications apparatus may further include a memory 1306.

The memory is configured to be coupled to the processor, and the memory stores a program instruction and data that are necessary for the communications apparatus.

Figure 14A:
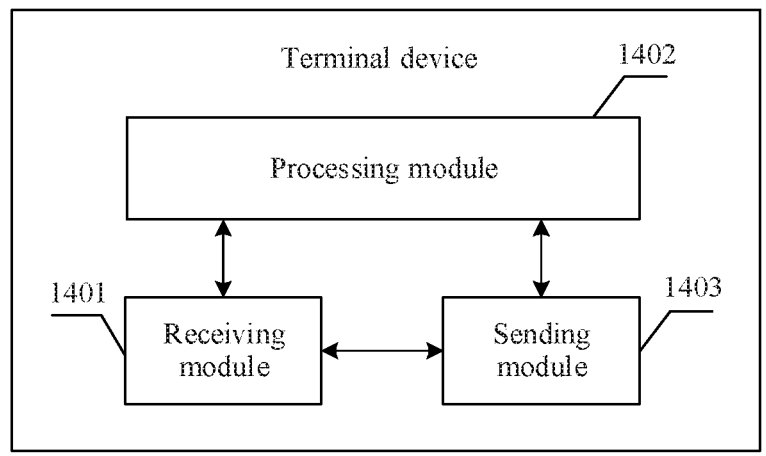
FIG. 14A and FIG. 14B are schematic structural diagrams of a terminal device according to an embodiment of the present invention.

As shown in FIG. 14A, a terminal device may include a receiving module 1401 and a processing module 1402. Optionally, the terminal device further includes a sending module 1403. The terminal device may be configured to perform an operation of the terminal device in FIG. 9. For example, the receiving module 1401 is configured to receive an association between an access network identifier and an LADN from an access network discovery network element (for example, an access network discovery and selection function network element in the 4G, or a PCF network element in the 5G); and the processing module 1402 is configured to access, based on the association between the access network identifier and the LADN, an access network corresponding to the access network identifier.

Based on the foregoing solution, when the terminal device moves and needs to reselect a non-3GPP access network, the terminal device sends, based on the obtained association between the access network identifier and a network name of the LADN, an access request to the access network device corresponding to the access network identifier. Because the access network device corresponding to the access network identifier supports the LADN, the terminal device can access an LADN service after the access network is changed, thereby improving user experience.

Optionally, before the terminal device accesses, based on the association between the access network identifier and the LADN, an access network corresponding to the access network identifier, the processing module 1402 is configured to determine that the terminal device accesses the LADN by using a first session. Therefore, in a scenario of the non-3GPP access network, the terminal device may access, by knowing a network name of a specific LADN that is accessed by the terminal device by using the first session and based on an obtained association between an identifier of a candidate access network that can be accessed and the network name of the LADN, an access network device supporting the specific LADN. Therefore, after an access network of the terminal device is changed, a service of the specific LADN is not interrupted, thereby improving user experience.

In addition, the receiving module 1401, the processing module 1402, and the sending module 1403 in the terminal device may further implement other operations or functions of the terminal device in the foregoing methods. Details are not described herein again.

Figure 14B:
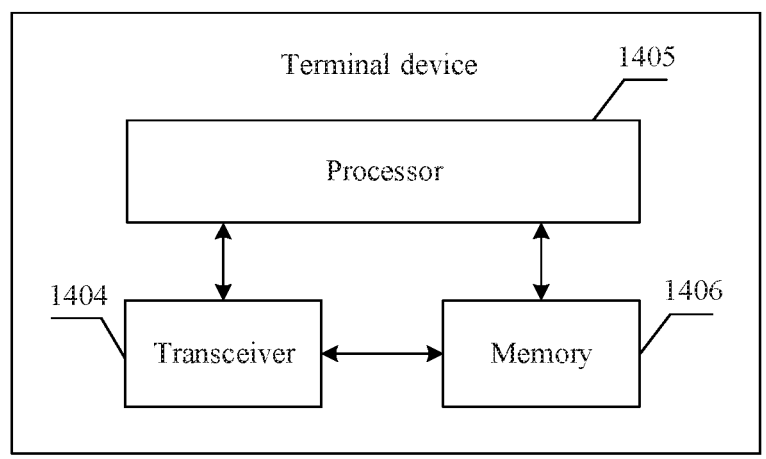

FIG. 14B is another possible schematic structural diagram of a terminal device in the foregoing embodiments. As shown in FIG. 14B, the terminal device includes a transceiver 1404 and a processor 1405. For example, the processor 1405 is configured to support the terminal device in performing a corresponding function of the terminal device in the foregoing method. The transceiver 1404 is configured to implement communication between the terminal device and an access discovery network element. The terminal device may further include a memory 1406. The memory is configured to be coupled to the processor, and the memory stores a program instruction and data that are necessary for the terminal device. It may be understood that FIG. 10B, FIG. 11B, FIG. 12B, FIG. 13B, and FIG. 14B show merely simplified designs of the foregoing devices. In actual application, each of the foregoing devices may include any quantities of transmitters, receivers, processors, controllers, memories, communications units, and the like. All devices that can implement this application fall within the protection scope of this application.

The controller/processor configured to perform the radio access network device in this application may be a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

Method or algorithm steps described in combination with the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the radio access network device. Certainly, the processor and the storage medium may alternatively exist in the radio access network device as discrete components.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A method, comprising:
obtaining, by a first radio access network (RAN) device, capability information of a second RAN device, wherein the capability information indicates a local area data network (LADN) supported by the second RAN device, and the capability information comprises a data network name (DNN) of the LADN, an internet protocol (IP) address or prefix of the LADN, or IP routing information of the LADN;
in response to determining, according to the capability information of the second RAN device, that the second RAN device supports the LADN, selecting the second RAN device to handover a terminal device; and
sending, by the first RAN device, a handover request message to the second RAN device.

2. The method according to claim 1, wherein obtaining, by the first radio access network RAN device, the capability information of the second RAN device comprises:
sending, by the first RAN device, a connection setup request message to the second RAN device; and
receiving a connection setup response message from the second RAN device, wherein the connection setup response message comprises the capability information of the second RAN device.

3. The method according to claim 1, wherein before sending, by the first RAN device, the handover request message to the second RAN device, the method further comprises:
determining, by the first RAN device, that the terminal device is currently accessing the LADN using a first session.

4. The method according to claim 3, further comprising:
receiving, by the first RAN device, an association between a session identifier of the first session and a first network name of the LADN from a session management function (SMF) network element.

5. The method according to claim 3, further comprising:
receiving, by the first RAN device, a second network name from a session management function (SMF) network element, and determining that the second network name corresponds to the LADN.

6. The method according to claim 1, wherein the capability information comprises:
a correspondence between a cell identifier or a tracking area identifier and the DNN of the LADN, the IP address or prefix of the LADN, or the IP routing information of the LADN of the LADN.

7. A method, comprising:
obtaining, by a second radio access network (RAN) device, capability information of the second RAN device from an access and mobility management function (AMF) network element, wherein the capability information indicates a local area data network (LADN) supported by the second RAN device, and the capability information comprises a data network name (DNN) of the LADN, an internet protocol (IP) address or prefix of the LADN, or IP routing information of the LADN;
sending, by the second RAN device, the capability information to a first RAN device; and
receiving, by the second RAN device, a handover request from the first RAN device requesting to handover a terminal device to the second RAN device, the second RAN device being selected for the terminal device to handover to according to the second RAN supporting the LADN.

8. The method according to claim 7, wherein obtaining, by the second RAN device, the capability information of the second RAN device from the AMF network element comprises:
obtaining, by the second RAN device, the capability information of the second RAN device from the AMF network element in a process of setting up a connection between the second RAN and the AMF network element.

9. The method according to claim 7, wherein sending, by the second RAN device, the capability information to the first RAN device comprises:
receiving, by the second RAN device, a connection setup request message from the first RAN device; and
sending a connection setup response message to the first RAN device, wherein the connection setup response message comprises the capability information.

10. The method according to claim 7, wherein the capability information comprises:
a correspondence between a cell identifier or a tracking area identifier and the DNN of the LADN, the IP address or prefix of the LADN, or the IP routing information of the LADN.

11. An apparatus, configured to act as a first radio access network (RAN) device, the apparatus comprising:
a processor; and
a non-transitory computer-readable storage medium storing a program to be executed by the processor, the program including instructions for:
obtaining capability information of a second RAN device, wherein the capability information indicates a local area data network (LADN) supported by the second RAN device, and the capability information comprises a data network name (DNN) of the LADN, an internet protocol (IP) address or prefix of the LADN, or IP routing information of the LADN; and
in response to determining, according to the capability information of the second RAN device, that the second RAN device supports the LADN, selecting the second RAN device to handover a terminal device; and
sending a handover request message to the second RAN device.

12. The apparatus according to claim 11, wherein the instructions for obtaining the capability information of the second RAN device comprise instructions for:
sending a connection setup request message to the second RAN device; and
receiving a connection setup response message from the second RAN device, wherein the connection setup response message comprises the capability information of the second RAN device.

13. The apparatus according to claim 11, wherein the program further includes instructions for:
before sending the handover request message to the second RAN device, determining that the terminal device is currently accessing the LADN using a first session.

14. The apparatus according to claim 13, wherein the program further includes instructions for:
receiving an association between a session identifier of the first session and a first network name of the LADN from a session management function (SMF) network element.

15. The apparatus according to claim 13, wherein the program further includes instructions for:
receiving a second network name from a session management function (SMF) network element, and determining that the second network name corresponds to the LADN.

* * * * *